United States Patent [19]
Benthin

[11] Patent Number: 5,443,109
[45] Date of Patent: Aug. 22, 1995

[54] WINDOW SHADE DRIVE

[75] Inventor: Siegfried Benthin, Bremerhaven, Germany

[73] Assignee: Benthin AG, Bremerhaven, Germany

[21] Appl. No.: 143,180

[22] Filed: Oct. 26, 1993

[30] Foreign Application Priority Data

Nov. 25, 1992 [DE] Germany .................... 42 39 507.0

[51] Int. Cl.⁶ ............................................. E06B 9/56
[52] U.S. Cl. ..................................... 160/298; 160/319
[58] Field of Search ............... 160/319, 298, 307, 299, 160/305, 308, 323.1, 324, 325, 326, 321; 192/54, 93 A

[56] References Cited

U.S. PATENT DOCUMENTS

| | | |
|---|---|---|
| 4,433,765 | 2/1984 | Rude et al. |
| 4,519,487 | 5/1985 | Florin .................... 160/319 X |
| 4,534,396 | 8/1985 | Jung .................... 160/319 X |

FOREIGN PATENT DOCUMENTS

WO91/03619  3/1991  WIPO .

*Primary Examiner*—David M. Purol
*Attorney, Agent, or Firm*—McGlew and Tuttle

[57] ABSTRACT

The present invention pertains to a window shade drive with an automatically acting coupling, which has friction surfaces and is arranged between a stationary component (9) and a driving member (3) connected to the winding shaft, wherein two coupling elements are movable axially and in the direction of rotation in relation to one another to operate the coupling by rotating the drive member. In such a drive, one of the coupling members is connected to the drive member (8) by a member (7, 18), which generates a torque between this coupling element (disk 5) and the drive member (8) within a range, and the other coupling element is provided at an end disk of an assembly of a plurality of brake disks (1, 2), wherein the end disk is coupled non-rotatably, but axially displaceably with the driving member. The brake disks (1, 2) are alternatingly connected rotatably to the driving member (3) and to a stationary component (9). The assembly of brake disks (1, 2) is supported by a stationary axial bearing (14) on a stationary component, and structure, by which axial forces are applied to the assembly of brake disks (1, 2) during a rotary movement of the two coupling elements in relation to one another, are provided between the two coupling elements.

8 Claims, 3 Drawing Sheets

WINDOW SHADE DRIVE

FIELD OF THE INVENTION

The present invention pertains to a window shade drive with a rotatably mounted drive member and with an assembly consisting of a plurality of friction disks between a winding shaft and a stationary pin, wherein the friction disks are alternatingly connected nonrotatably either to the winding shaft or to the stationary pin and are arranged axially movably and wherein a relative rotary movement of a drive member in relation to the winding shaft abolishes a frictionally engaged connection of the friction disks.

BACKGROUND OF THE INVENTION

A window shade drive possessing these class characteristics has been known from WO 91/03619. The brake disks in this prior-art arrangement are pressed against each other by a coil spring acting axially in relation to the axis of the winding shaft in order to generate the frictional forces, which are greater than the weight of the window shade unwound nearly completely. To overcome the friction, an axial cam is provided between a drive wheel and the winding shaft. Through this correspondingly strong axial forces are to be applied to overcome the spring tension and these forces become noticeable in an undesired manner during the operation of the window shade.

U.S. Pat. No. 4,433,765 discloses a window shade drive, in which a plurality of radially tensioning springs are arranged between two coaxially mounted, cylindrical elements and they automatically bring about a coupling between a drive member and a stationary component, so that the coupling can be released by rotating a drive member.

SUMMARY AND OBJECTS OF THE INVENTION

An object of the present invention is to design a window shade drive of the type defined with the simplest possible components, in which the holding force is increased by the weight of the window shade and which runs easily during operation.

According to the invention, a window shade drive is provided including a rotatably mounted drive member and with an assembly including a plurality of friction disks positioned between a winding shaft and a stationary pin. The friction disks are alternatingly connected to the winding shaft or the stationary pin in a nonrotatable axially moveable manner.

A first coupling element and a second coupling element are positioned axially moveable on a stationary pin and are provided positioned between the assembly of friction disks and the drive member. The first coupling element is connected to the drive member rotatably within a predetermined angle range. A weak torque spring is provided biasing said first coupling element in one direction of said predetermined angle range. The second coupling element is provided at an end disk of said friction disk assembly. The end disk is nonrotatably connected to the winding shaft. A camming surface is provided at a connection between the first coupling element and the second coupling element for generating axial forces acting on the friction disks upon relative rotary movement of the first coupling element and the second coupling element.

The action of the coupling elements is important in conjunction with the action of the friction disks their axial coupling forces are induced by a relatively weak torque spring or the like in such a way that the weight of the window shade hanging down inevitably leads to an increase in the axial coupling forces between the individual friction disks. A window shade drive possessing the characteristics according to the present invention is therefore particularly suitable for heavy window shade weights, because it requires only weak forces for its operation, regardless of the weight of the window shade.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 4:
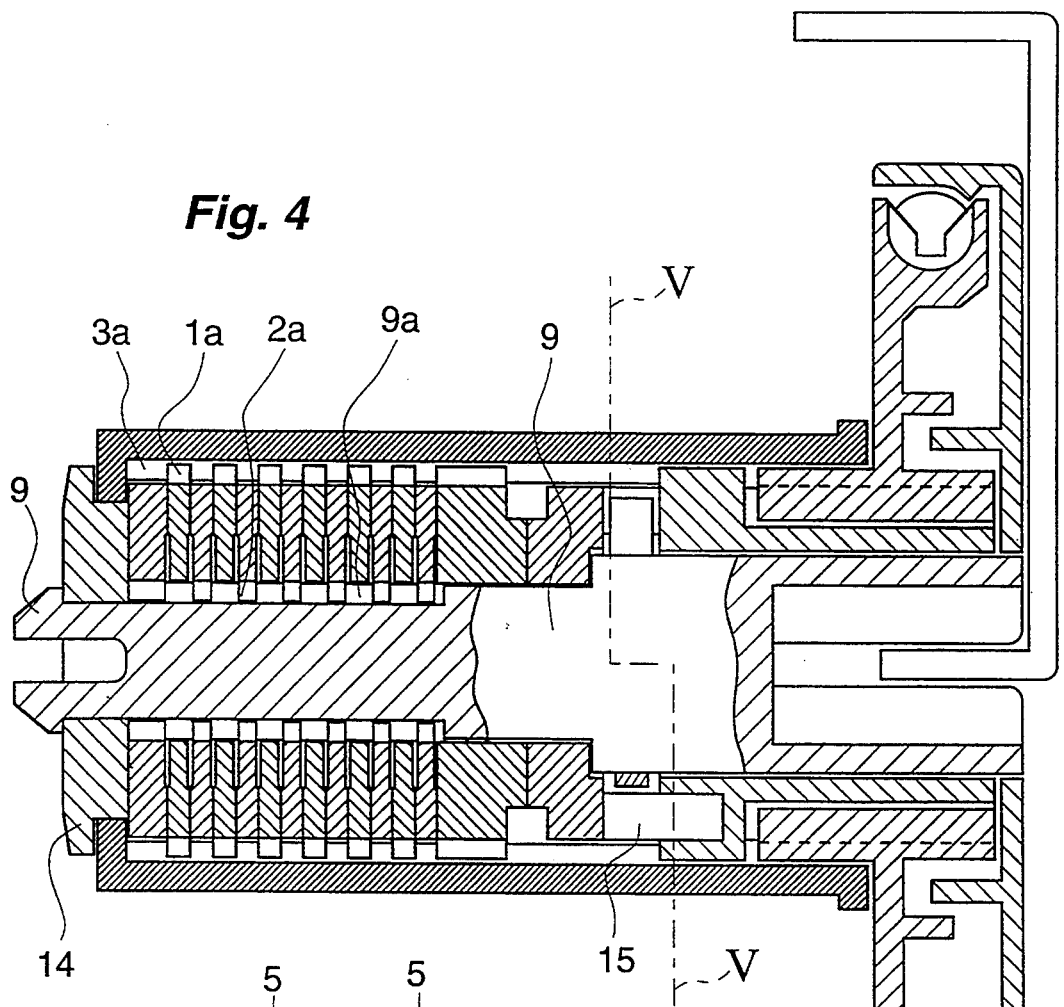
FIG. 4 is an enlarged cross sectional view of the embodiment of FIG. 1.
Figure 5:
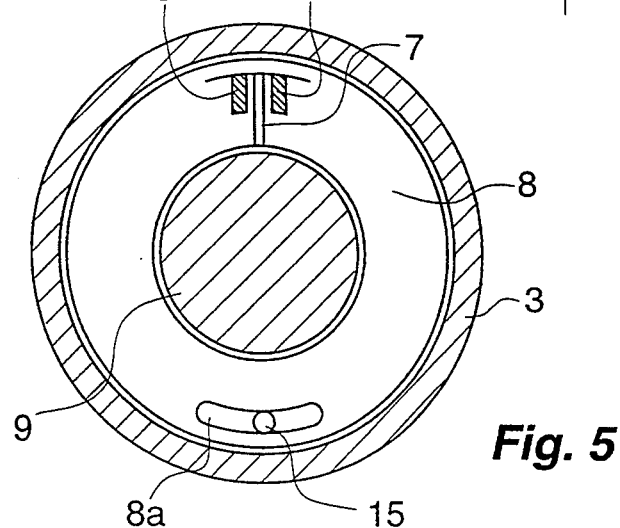
FIG. 5 is a cross sectional view taken along the view line V—V in FIG. 4.

The window shade drive is installed at one end of the window shade and can be operated via a bead chain 12, a pull-cord or the like. The bead chain 12 is placed over a chain wheel 10, which is nonrotatably connected or fixed to a drive member 8. The drive member 8 is mounted rotatably on a stationarily anchored pin 9, which is arranged concentrically in a sleeve acting as a drive member, or immediately in the winding shaft 3. The pin 9 can be fastened by means of a wall bracket 11 or the like. A coupling element 5 in the form of a disk is supported by a shoulder 19 of the stationary component 9, and the coupling element 5 cooperates with a coupling element 4, which is likewise in the form of a disk and is mounted axially displaceably and rotatably on the stationary component 9. The coupling element 5 engages a segment-shaped recess 8a of the drive member 8 with a pin 15, so that the coupling element 5 and the drive member 8 are movable in relation to one another through an angle of rotation determined by the recess. A low torque, acting as a holding force, is continuously applied by a weak torque spring 7 to the coupling element 5, so that the pin 15 is located at one end of the segment-shaped recess. The coupling element 4 forms an end disk of an assembly consisting of a plurality of friction disks 1 and 2, which are in close contact with friction surfaces on their respective front sides. The friction disks 1 and 2 are arranged alternatingly such that the friction disks 1 are nonrotatably connected to the winding shaft 3, and the friction disks 2 are connected nonrotatably to the stationary pin 9. The connections of the friction disks 1 with the winding shaft 3 and of the friction disks 2 with the stationary pin 9 are, however, axially displaceable. As shown in FIG. 4, the brake disks 1, which are nonrotatably coupled with the winding shaft 3, have on their outer circumference, radial projections 1a which extend into an axially extending groove 3a of the winding shaft. As a result, the brake disks 1 are axially displaceable, and they are nonrotatably connected to the winding shaft 3. The other brake disks 2 have inner radial projections 2a, which extend into an axially extending groove 9a of the stationary pin 9. As a result, these brake disks are also axially displaceable, and they are nonrotatably connected to the stationary pin 9. The assembly consisting of the friction disks 1 and 2 is supported at the opposite end by a thrust bearing 14 arranged stationarily on the pin 9. Means which cause axial forces to act on the assembly of the friction disks 1 and 2 during rotation of the coupling elements 4 and 5 in relation to one another are provided between the two coupling elements 4 and 5 arranged coaxially on the pin 9. These axial forces are initiated by the torque originating from the spring 7 in both directions of rotation.

Corresponding axial forces, which prevent the window shade from being lowered and unwound, are generated by the axial cam 13 during the rotation of the coupling element 4 by the weight of the window shade hanging down. The rotation of the winding shaft 3 is blocked by the friction disks pressed against each other. The axial forces can be abolished and the window shade can be lowered by slightly rotating the drive member 8 in the opposite direction. This rotary movement is transmitted by the carrier pin 6 onto the coupling element 5. Only the weak tensioning forces of the spring 7 need to be overcome.

During the raising of the window shade, i.e., during winding up on the winding shaft 3, the brake force is switched off due to synchronization of the friction disks 1 and 2 as well as of the two coupling elements 4 and 5, and consequently due to the elimination of the axial force. Therefore, only the weight of the window shade and the relatively weak servo force originating from the spring 7 must be overcome during the raising of the window shade. In contrast, only the servo force originating from the spring 7 and the friction of the coupling element 5 are to be overcome during the lowering of the window shade. During the lowering of the window shade, the frictional force of the friction disks 1 and 2 is overcome by the weight of the window shade after reduction in the axial pressure. As a result, uniformly easy operation is guaranteed even in the case of heavy window shades. A strong holding force is generated by the weak force of the spring 7 in the resting position. The servo force originating from the spring 7 now has a safety function only.

Figure 1:
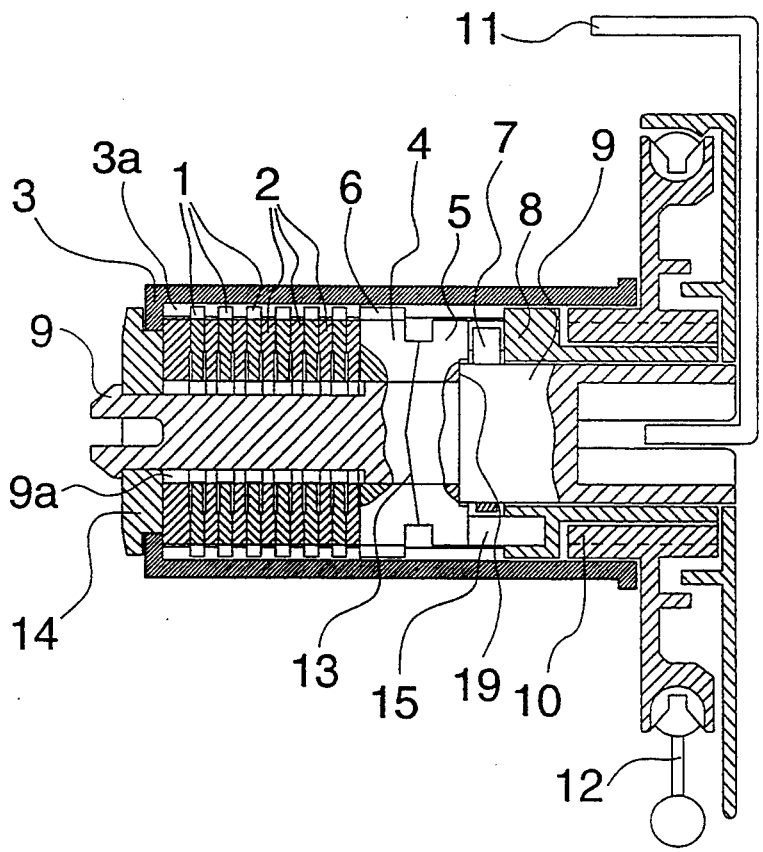
FIG. 1 is a longitudinal cross sectional view through an axial plane of the winding shaft of a window shade according to a first embodiment of the invention.

In the exemplary embodiment according to FIG. 1, camming means are provided for converting the drive forces are converted into axial forces between the coupling segments 5 and 4 by cam surfaces 13 on both the disk-shaped coupling elements 4 and 5, which are mutually in contact with one another, so that axial forces act on the assembly consisting of the friction disks 1 and 2 due to rotation of the two coupling elements 4 and 5 in relation to one another.

Figure 2:
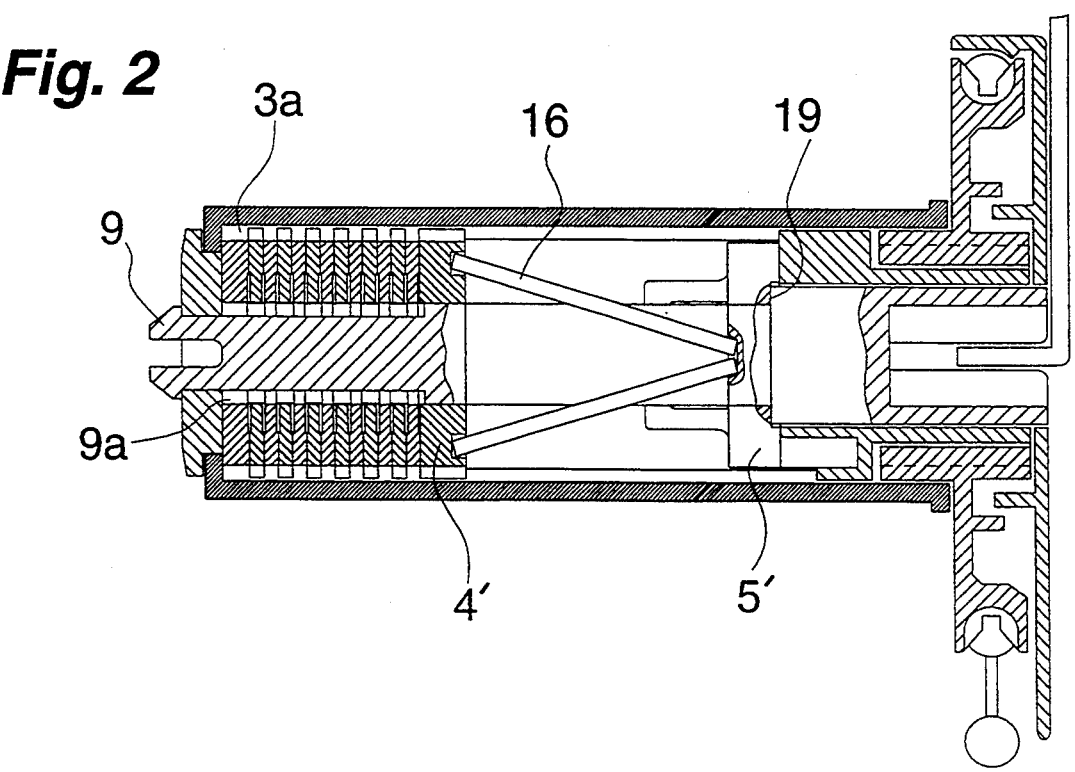
FIG. 2 is a longitudinal cross sectional view through an axial plane of the winding shaft of a window shade according to a second embodiment of the invention.

In the arrangement according to FIG. 2, straight pins 16 form camming means which are arranged between the coupling elements 4' and 5' such that their longitudinal axes form an angle with the longitudinal axis of the window shade, as a result of which axial forces are also generated during rotation of the coupling elements 4' and 5' in relation to one another.

A similar action can also be achieved by means of insert wedges 17 acting as camming means, whose tip is supported by the coupling element 5'' and whose opposite end is supported by the coupling element 4''. An axial force component acts against the coupling element 4'' and consequently on the friction disk assembly during rotation of the coupling elements 4'' and 5'' in relation to one another in this case as well.

Figure 3:
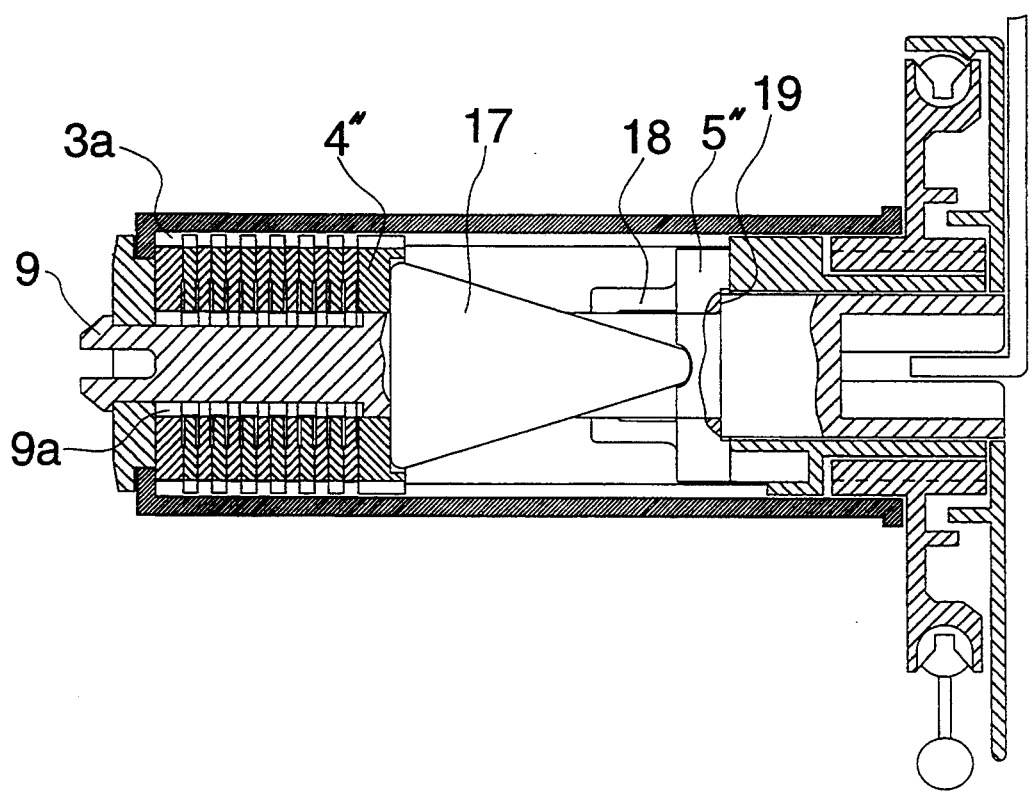
FIG. 3 is a longitudinal cross sectional view through an axial plane of the winding shaft of a window shade according to a third embodiment of the invention.

Unlike from the arrangement of a the torque spring 7 according to the example shown in FIG. 1, a stationary brake 18 with relatively weak braking force for the coupling element 5' and 5'' is provided instead of the torque spring in the examples according to FIGS. 2 and 3, wherein the brake 18 prevents the rotary movement of the coupling element 5' and 5'' on the stationary pin 9 within the range of angles of rotation defined by the pin 15 in the recess. The stationary brake 18 preferably forms the braking force by contacting the stationary pin 9. As a result, jamming of the straight pins 16 or of the wedges 17 is achieved during the rotation of the coupling element 4' and 4'' due to the weight of the window shade, so that an axial force will act on the assembly of the friction disks 1 and 2.

APPENDIX
List of Reference Numerals

1 Friction disk
2 Friction disk
3 Winding shaft
4 Coupling element
5 Coupling element
6 Carrier pin
7 Torque spring
8 Drive member
9 Pin
10 Chain wheel
11 Wall bracket
12 Bead chain
13 Axial cam
14 Thrust bearing
15 Carrier pin
16 Straight pin
17 Wedge
18 Brake

What is claimed is:
1. A window shade drive, comprising:
a rotably mounted drive member;
a winding shaft;
a stationary pin;
a friction disk assembly including a plurality of friction disks positioned between said winding shaft and said stationary pin, an end disk of said plurality of friction disks being nonrotatably connected to said winding shaft, said friction disks being alternatingly connected nonrotatably and axially movably to said winding shaft or said stationary pin;
a first coupling element;
a second coupling element, said first coupling element and said second coupling element being positioned between said friction disk assembly and said drive member, said first coupling element being connected to said drive member and being rotatably relative to said drive member within a predetermined angle range;

a weak torque spring biasing said first coupling member in one direction of said predetermined angular range, said second coupling element being provided at said end disk of said friction disk assembly; and camming means connected between said first coupling element and said second coupling element for generating axial forces acting on said friction disks upon rotary movement of said first coupling element and said second coupling element in relation to one another.

2. A window shade drive according to claim 1, wherein:

said camming means includes means for increasing a distance between said first coupling element and said second coupling element to push said first coupling element and said second coupling element axially apart during rotation of said first coupling element and said second coupling element in relation to one another.

3. A window shade drive according to claim 2, wherein:

said camming means includes axially rising cams provided on end surfaces of said first coupling element and said second coupling element, said axially rising cams being mutually in contact with one another.

4. A window shade drive according to claim 2, wherein:

said camming means includes tilting elements supported on each of said first coupling element and said second coupling element at different distances from a longitudinal axis of said pin.

5. A window shade drive according to claim 4, wherein:

said tilting elements include straight pins arranged with a longitudinal axis forming an angle with said longitudinal axis of said pin.

6. A window shade drive according to claim 4, wherein:

said tilting elements include wedges having a tip supported by said first coupling element and having another end supported by said second coupling element.

7. A window shade drive according to claim 1, further comprising:

a brake member generating a torque between said first coupling element and said drive member, said brake having a relatively weak braking force.

8. A window shade drive comprising:

a stationary pin;

a drive member rotatably mounted on said stationary pin;

a first coupling element rotatably mounted on said stationary pin, and said first coupling element being rotatable with respect to said drive member within a predetermined angular range;

a winding shaft rotatably positioned around said stationary pin;

a first plurality of friction disks positioned in said winding shaft, said first plurality of friction disks being rotatably fixed and axially movable with respect to said winding shaft; a second plurality of friction disks positioned on said stationary pin, said second plurality of friction disks being positioned alternatingly between said first plurality of friction disks, said second plurality of friction disks being rotatably fixed and axially movable with respect to said stationary pin;

torque means for applying a torque to said first coupling member;

a second coupling member positioned adjacent said first and second plurality of friction disks;

camming means connected between said first coupling element and said second coupling element for generating axial forces acting on said friction disks upon rotary movement of said first coupling element with respect to said second coupling element.

* * * * *